US012261003B2

(12) United States Patent
Shi et al.

(10) Patent No.: US 12,261,003 B2
(45) Date of Patent: Mar. 25, 2025

(54) EXCITATION PROTECTION DEVICE ACTING STEP BY STEP WITH SINGLE EXCITATION SOURCE

(71) Applicant: XI' AN SINOFUSE ELECTRIC CO., LTD., Shaanxi (CN)

(72) Inventors: Xiaoguang Shi, Shaanxi (CN); Shaobo Duan, Shaanxi (CN); Xin Wang, Shaanxi (CN); Xibin Ge, Shaanxi (CN)

(73) Assignee: XI' AN SINOFUSE ELECTRIC CO., LTD., Shaanxi (CN)

( * ) Notice: Subject to any disclaimer, the term of this patent is extended or adjusted under 35 U.S.C. 154(b) by 0 days.

(21) Appl. No.: 18/014,252

(22) PCT Filed: Sep. 30, 2022

(86) PCT No.: PCT/CN2022/123433

§ 371 (c)(1),
(2) Date: Jan. 3, 2023

(87) PCT Pub. No.: WO2023/071713

PCT Pub. Date: May 4, 2023

(65) Prior Publication Data

US 2024/0249899 A1 Jul. 25, 2024

(30) Foreign Application Priority Data

Oct. 27, 2021 (CN) ......................... 202111252921.3
Oct. 27, 2021 (CN) ......................... 202122591504.3

(51) Int. Cl.
*H01H 39/00* (2006.01)
*H01H 9/30* (2006.01)

(52) U.S. Cl.
CPC ............ *H01H 39/006* (2013.01); *H01H 9/30* (2013.01); *H01H 2039/008* (2013.01)

(58) Field of Classification Search
CPC .. H01H 39/006; H01H 9/30; H01H 2039/008; H01H 39/00

(Continued)

(56) References Cited

U.S. PATENT DOCUMENTS 9,704,681 B2 * 7/2017 Fukuyama ........... H01H 39/006
11,784,021 B2 * 10/2023 Shi ......................... H01H 85/10 337/121

(Continued)

FOREIGN PATENT DOCUMENTS

CN 206076165 U 4/2017
CN 110797835 A 2/2020

(Continued)

OTHER PUBLICATIONS

Decision to Grant a Patent for Japanese Patent Application No. 2022-580730 issued by the Japanese Patent Office on May 7, 2024.

(Continued)

*Primary Examiner* — Lheiren Mae A Caroc
(74) *Attorney, Agent, or Firm* — IP & T GROUP LLP

(57) ABSTRACT

Provided is an excitation protection device acting step by step with a single excitation source, including a shell body, an excitation source, impact devices and a conductor, wherein at least two impact devices respectively located in different cavities are provided in the shell body, one side of the impact device is provided with one excitation source, and the impact device and the excitation source are respectively in sealed contact with the cavities where the impact device and the excitation source are located; and the excitation source drives the impact devices to displace simultaneously or successively, and at least one of the impact devices breaks the conductor during the displacement process.

20 Claims, 16 Drawing Sheets

(58) Field of Classification Search
USPC ........................................................ 200/61.08
See application file for complete search history.

(56) References Cited

U.S. PATENT DOCUMENTS

| | | | | |
|---|---|---|---|---|
| 2010/0089739 | A1 | 4/2010 | Filiputti et al. | |
| 2023/0178321 | A1* | 6/2023 | Sun ...................... | H01H 39/006 200/237 |

FOREIGN PATENT DOCUMENTS

| | | | |
|---|---|---|---|
| CN | 212625470 | U | 2/2021 |
| CN | 112447462 | A | 3/2021 |
| CN | 213601830 | U | 7/2021 |
| CN | 213601831 | U | 7/2021 |
| CN | 113539763 | A | 10/2021 |
| CN | 113851336 | A | 12/2021 |
| CN | 215988477 | U | 3/2022 |
| DE | 19732650 | A1 | 2/1999 |

OTHER PUBLICATIONS

International Search Report for International Application No. PCT/CN2022/123433 issued by the International Searching Authority on Dec. 16, 2022.
Written Opinion for International Application No. PCT/CN2022/123433 issued by the International Searching Authority on Dec. 16, 2022.
Office Action for Japanese Patent Application No. 2022-580730 issued by the Japanese Patent Office on Jan. 23, 2024.
Office Action for European Patent Application No. 22830119.8 issued by the European Patent Office on Jan. 8, 2024.
Supplementary European Search Report for European Patent Application No. 22830119.8 issued by the European Patent Office on Dec. 22, 2023.

* cited by examiner

Valve in closed state

Valve in open state initial state

First impact device in action ending state

First impact device and second impact device being in action ending state initial state First impact device in action ending state First impact device and second impact device being in action ending state

EXCITATION PROTECTION DEVICE ACTING STEP BY STEP WITH SINGLE EXCITATION SOURCE

CROSS-REFERENCE TO RELATED APPLICATION

The present disclosure is a national stage application of PCT/CN2022/123433 filed on Sep. 30, 2022, which claims priority of Chinese patent applications with the filing number 202111252921.3 filed on Oct. 27, 2021 with the Chinese Patent Office, and entitled "Excitation Protection Device Acting Step by Step with Single Excitation Source", and with the filing number 202122591504.3 filed on Oct. 27, 2021 with the Chinese Patent Office, and entitled "Excitation Protection Device Acting Step by Step with Single Excitation Source", the contents of which are incorporated herein by reference in entirety.

TECHNICAL FIELD

The present disclosure relates to the fields of electric power control and electric vehicles, and in particular to an excitation protection device that breaks a conductor step by step through one excitation source for performing current breaking.

BACKGROUND ART

At present, in addition to the traditional hot melting fuse, the battery pack protection component of the electric vehicle already has a structure that quickly cuts off the circuit, that is, the excitation protection device, and the application range is gradually expanded. It is mainly to overcome the shortcomings of traditional fuses, such as large heat generation, high power consumption, large volume and weight, limited capacity of resistance to current impact, long breaking time, and uncontrolled breaking process.

The general structure of the excitation protection device has a shell body, in which an excitation source, impact devices and a conductor are provided in sequence, and a pre-fracture is arranged on the conductor. The working principle thereof is that: when a fault current occurs in the main circuit of the battery pack, the excitation source in the excitation protection device connected in series in the main circuit of the battery pack is triggered, the excitation source acts to generate high-pressure gas, such that the impact device is pushed down to break the pre-fracture of the conductor, a physical fracture is thus formed on the conductor. Since the conductor of the excitation protection device is connected in series with the main circuit of the battery pack, the arc generated at the conductor fracture is gradually cooled and extinguished in the air, and the current is cut off to achieve the purpose of quickly cutting off the circuit.

The earliest excitation protection device includes a single excitation source, a single impact device and one conductor provided with a pre-fracture. It has the advantages of good current impact resistance, low power consumption and rapid breaking etc., and simultaneously, also has the disadvantages of low breaking capacity, insufficient arc extinguishing capacity, and low breaking voltage and the like. Based on the disadvantages of the above-mentioned structure, researchers have developed a device including a single excitation source, a single impact device, and a conductor provided with two or more pre-fractures. The sequence of breaking of two or more pre-fractures of the conductor is regulated by providing punching heads with different heights on the impact device, which to a certain extent solves the problem of low breaking capacity, insufficient arc extinguishing capacity and low breaking voltage of one pre-fracture. However, there are also the following shortcomings: the sequence and time difference of the breaking of multiple pre-fractures are only adjusted by the height difference of the punching heads of a single impact device, and there are few adjustable parameters and the adjustable range is small; during the movement, the punching heads with different heights of the impact device break the pre-fractures successively, which will cause the overall force of the impact device to be uneven, thus the impact device is easily broken, thereby affecting the breaking.

SUMMARY

Aiming at the above-mentioned shortcomings, an excitation protection device acting step by step with a single excitation source is designed in the present disclosure, at least two independent impact devices are driven by one excitation source to cut off the conductor simultaneously or in time sequence, thereby breaking the circuit. On this basis, the melt may also be connected in parallel with the conductor, and the conductor and the melt can be broken in sequence through the impact device, or a mode in which one impact device breaks the conductor and another impact device breaks the melt is realized.

The present disclosure provides an excitation protection device acting step by step with a single excitation source, the excitation protection device acting step by step with a single excitation source may include a shell body, an excitation source, impact devices and a conductor, wherein at least two impact devices respectively located in different cavities may be provided in the shell body, one side of the impact device may be provided with one excitation source, and the impact device and the excitation source may be respectively in sealed contact with the cavities where the impact device and the excitation source are located; and the excitation source drives the impact devices to displace simultaneously or successively, and at least one of the impact devices breaks the conductor during the displacement process. The technical solution of the present disclosure achieves at least the above-mentioned technical purpose.

Optionally, the shell body may be provided with at least one valve structure, and the valve structure may be selected from a pressure regulating valve, a one-way valve, a reversing valve or a pressure relief valve.

Optionally, each of the valve structures may be driven by the excitation source, or the impact device, or the broken conductor, wherein when two or more valve structures are provided, all the valve structures may be driven by a same one of the excitation source, the impact device, and the broken conductor, or two valve structures of all the valve structures may be respectively driven by different two of the excitation source, the impact device, and the broken conductor.

Optionally, the shell body may comprise an upper shell body and a lower shell body provided in a sealed connection with the upper shell body, the conductor may be penetrated between contact surfaces of the upper shell body and the lower shell body, and two ends of the conductor may be located outside the shell body.

Optionally, at least one melt may be connected in parallel with the conductor.

Optionally, at least one of the impact devices may break the conductor; at least one of the impact devices may break the melt or sequentially break the conductor and the melt.

Optionally, a fusion weakened part and a break weakened part may be provided on the melt, and the break weakened part may be located at a position broken by the impact device.

Optionally, a push block may be provided in a cavity near the impact device at the break weakened part of the melt, a position-limiting structure configured to limit an initial position of the push block may be provided between the push block and the cavity where the push block is located.

Optionally, the fusion weakened part may be located in a closed cavity filled with an arc extinguishing medium.

Optionally, in a case that the cavity where the excitation source is located is respectively communicated with the cavities where the individual impact devices are located, when the excitation source acts, the impact devices may be driven to act simultaneously or successively; or, in a case that the cavity where the excitation source is located is communicated with a cavity where one of the impact devices is located, the cavities where the individual impact devices are located are respectively communicated in series through flow passages, when the excitation source acts, the impact devices may be driven to act successively.

Optionally, when the cavities where the individual impact devices are located are respectively communicated in series through the flow passages, the impact device act first may be displaced to open a flow passage opening communicating the cavity where the impact device act subsequently is located with the cavity where the impact device act first is located.

Optionally, one of the impact devices may be centrally provided, and the other impact devices may be arranged around an outer side of the centrally provided impact device at intervals.

Optionally, the impact device may be arranged around an outer side of the cavity where the excitation source is located.

Optionally, the impact devices located on the outer side of the centrally provided impact device are all in annular structures, and may be sequentially sleeved on an outer periphery of the centrally provided impact device at intervals.

Optionally, the impact device in the annular structure may be respectively provided with notches at a position of the conductor, and the conductor may be located in the notches when the impact device in the annular structure is displaced to break the melt.

Optionally, a sealing device configured to seal contact surfaces may be provided between contact surfaces of the impact device and the cavity where the impact device is located and between contact surfaces of the excitation source and the cavity where the excitation source is located.

Optionally, the shell body may further comprise a shell body of the melt provided at a bottom of the shell body, the melt may be penetrated in the shell body of the melt, and two ends of the melt pass through the shell body of the melt and then are connected in parallel with the conductor; and a cavity for the impact device to break the melt may be provided on the shell body of the melt.

Optionally, an indicator device in sealed contact with the shell body may be provided on the shell body, a position-limiting mechanism may be provided between the indicator device and the shell body; the indicator device communicates with the cavity where one of the impact devices acting simultaneously is located through a flow passage, or communicates with the cavity where one act last of the impact devices acting successively is located through the flow passage; an opening position of the flow passage of the indicator device in the cavity where the impact device is located satisfies: when actions of all the impact devices are completed, the indicator device overcomes the position-limiting mechanism to displace under an action of the driving force generated by the excitation source, and one end of the indicator device protrudes out of the shell body.

Optionally, the excitation source may be an electronic ignition device or a hydraulic device that can receive an excitation signal and act; the electronic ignition device may release high-pressure gas, and the hydraulic device may release insulating high-pressure liquid.

Compared with the related excitation protection device, the excitation protection device of the present disclosure has at least the following advantages.

Multiple impact devices are provided, and the impact devices act in a step-by-step and orderly manner without affecting each other, the force to the impact device is more uniform and the reliability is higher.

The high-pressure gas generated by the excitation source is subjected to a reasonable air pressure distribution, so that multiple impact devices act in a step-by-step and orderly manner, which can maximize the effective use of the energy of the high-pressure gas, reduce the possibility of gunpowder gas leaking to other chambers or the outside, and avoid adverse effects caused due to leakage.

The sequence and time difference of the actions of individual impact devices can be adjusted by adjusting multiple parameters such as the relative height position of the gas guide hole, the sectional area of the gas guide hole, the sectional area of the chamber of the impact device, and the movement stroke of the impact device; there are many adjustable parameters, and the adjustment range of the time difference can be widened by adjusting multiple parameters.

The excitation protection device of the present disclosure has excellent resistance to current impact; the arc extinguishing capability is improved, and rapid protection can be realized; the insulation performance after breaking is excellent; the sequence and time difference of the breaking of multiple fractures can be adjusted in a wide range, which is beneficial to the successful breaking of the excitation protection device and the improvement of the breaking capacity, thereby improving the reliability of the product.

BRIEF DESCRIPTION OF DRAWINGS

FIG. 22 (*b*) is a partial enlargement of FIG. 22 (*a*) in a ratio of 2:1;

FIG. 22 (*c*) is sectional schematic view of the one-way valve according to an embodiment of the present disclosure, and the one-way valve is in an open state;

FIG. 22 (*d*) is a partial enlargement of FIG. 22 (*c*) in a ratio of 2:1;

FIG. 23 (*b*) is a partial enlargement of FIG. 23 (*a*) in a ratio of 2:1;

FIG. 23 (*c*) is a sectional schematic view of the pressure relief valve driven by the excitation source according to another embodiment of the present disclosure;

FIG. 23 (*d*) is a partial enlargement of FIG. 23 (*a*) in a ratio of 2:1;

FIG. 24 (*b*) is a partial enlargement of FIG. 24 (*b*) in a ratio of 2:1;

FIG. 24 (*c*) is a sectional schematic view of the pressure relief valve when the first impact device is in action ending state;

FIG. 24 (*d*) is a sectional schematic view of the pressure relief valve when the first impact device and second impact device being in action ending state;

FIG. 24 (*e*) is a partial enlargement of FIG. 24 (*d*) in a ratio of 2:1;

FIG. 25 (*b*) is a partial enlargement of FIG. 25 (*a*) in a ratio of 2:1;

FIG. 25 (*c*) is a sectional schematic view of the pressure relief driven through the broken conductor when the first impact device is in action ending state;

FIG. 25 (*d*) is a sectional schematic view of the pressure relief driven though the broken conductor when the first impact device and second impact device being in action ending state;

FIG. 25 (*e*) is a partial enlargement of FIG. 25 (*d*) in a ratio of 2:1.

DETAILED DESCRIPTION OF EMBODIMENTS

Figure 1:
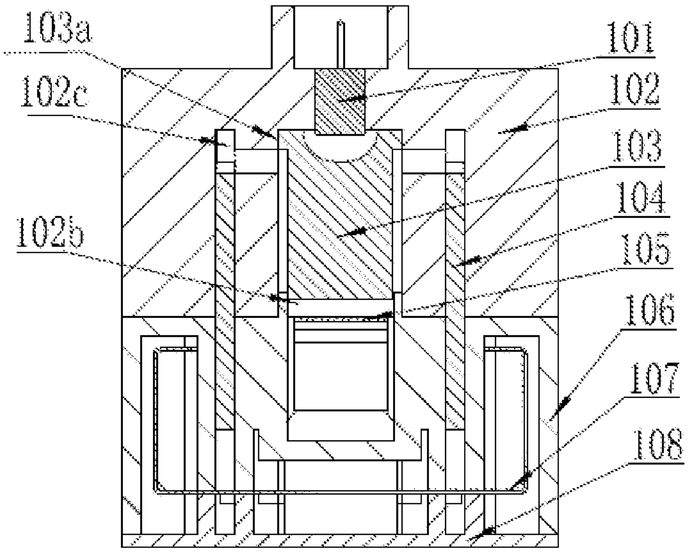
FIG. 1 is a schematic view of a sectional structure that an excitation protection device is in an initial position according to some embodiments of the present disclosure.
Figure 2:
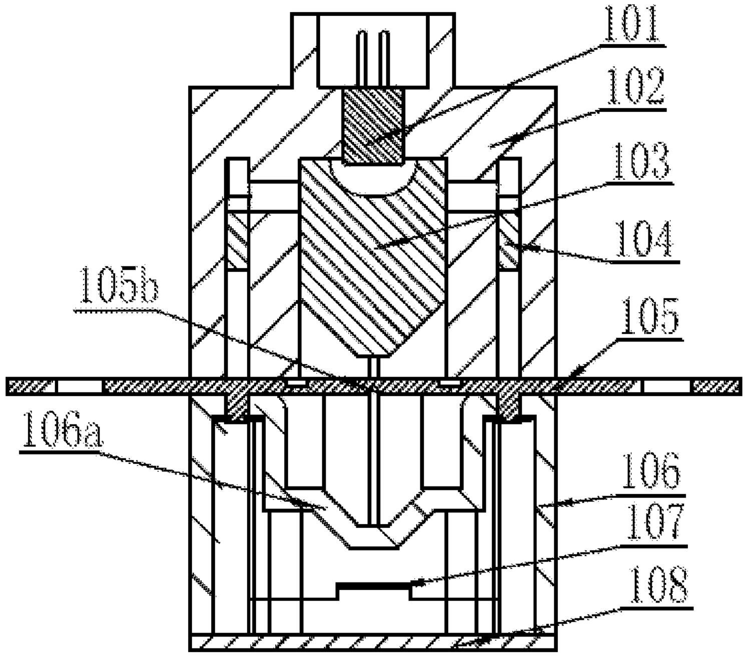
FIG. 2 is a schematic view of the sectional structure taken from a direction perpendicular to a sectional direction of FIG. 1 when the excitation protection device of FIG. 1 is in the initial position.
Figure 3:
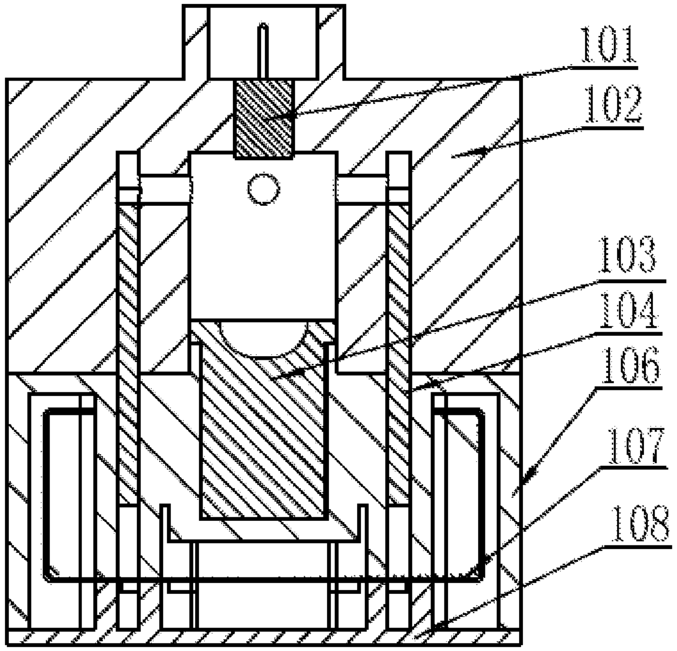
FIG. 3 is a schematic view of the sectional structure of the excitation protection device of FIG. 1 after the first impact device is actuated.

For the above-mentioned technical solutions, preferred embodiments are given and described in detail with reference to the drawings. The structural and positional relationships mentioned in the present disclosure, such as up and down, left and right, top, bottom, left, right, forward, backward, etc., do not constitute limitations to the present disclosure.

In some embodiments of the present disclosure, referring to FIG. 1 to FIG. 6, the shell body includes an upper shell body 102 and a lower shell body 106 butted therewith. Sealing is maintained between the contact surfaces of the upper shell body and the lower shell body 106. The upper shell body and the lower shell body are made of insulating material, which can be fully or partially injection-molded. A conductor 105 is penetrated between the contact surfaces of the upper shell body and the lower shell body, and the two ends of the conductor are respectively located outside the upper and lower shell bodies. When the excitation protection device is used, the two ends of the conductor may be connected in series to the outside circuit to protect it. Several cavities penetrating through the contact surfaces of the upper and lower shell bodies are respectively provided in the upper and lower shell bodies. The conductor 105 is in a long-strip plate-shaped structure. Position-limiting bumps 105*a* are provided on two sides of the conductor. The position-limiting bumps are clamped in the position-limiting grooves provided at corresponding positions on the lower shell body to position the conductor.

The upper shell body 102 is a hollow shell body provided with two cavities inside, the first cavity 102*b* is located in a middle position inside the upper shell body, the second cavity is provided at intervals on an outer peripheral side of the first cavity, and the second cavity 102*c* is in an annular structure, a gas flow passage is provided between the first cavity and the second cavity, and the first cavity and the second cavity respectively communicate with the cavity of the lower shell body. The conductor is penetrated through the first cavity 102*b*.

A cavity for accommodating the excitation source 101 is provided on the top of the upper shell body corresponding to the first cavity 102*b*, and the first cavity is in complete communication with the cavity for accommodating the excitation source. The excitation source 101 can be fixed on the upper shell body by means of submerged injection molding, or the excitation source 101 can be installed by arranging stepped holes in the cavity, the excitation source is fixed by arranging a pressing plate or a pressing cover (not shown in figure) on the upper shell body. The excitation source is in sealed contact with the cavity in which the excitation source is located. The excitation source can be actuated by receiving an excitation signal from the outside to generate a driving force for driving the movement of the first impact device. In this embodiment, the excitation source is an electronic ignition device, which can be ignited according to the received excitation signal, and the chemicals therein react to instantly release a large amount of high-pressure gas as a driving force.

The first impact device 103 is provided in the first cavity 102*b*, an annular position-limiting flange 103*a* is provided on the top of the first impact device 103, and the position-limiting flange is snapped on the top of the first cavity 102*b* and is in contact with the top inner wall of the upper shell body, so as to form a position-limiting structure configured to limit the initial position of the first impact device. The initial position of the first impact device can also be limited by providing grooves on the wall of cavity, and providing bumps on the first impact device, so that the bumps are embedded in the position-limiting structure in the grooves. The top of the first impact device 103 is in sealed contact with the top of the upper shell body. In the initial state, the gas flow passage between the first cavity 102*b* and the second cavity 102*c* can be blocked, and the first cavity 102*b* and the second cavity 102*c* are spaced with each other, so that the first cavity 102*b* and the second cavity 102*c* are not communicated; only when the first impact device overcomes the position limiting of the position-limiting flange and is displaced toward a direction of the conductor, and the first impact device and the top of the upper shell body change from sealed contact to non-sealed contact, the gas flow passage is exposed, and the first cavity and the second cavity are communicated with each other. A groove 103*a* is formed on the upper end surface of the first impact device, and the excitation source is located in the region where the groove 103*a* is located, thereby ensuring that all the high-pressure gas released by the excitation source first acts on the first impact device.

A position-limiting sliding groove penetrating through the contact surfaces of the upper and lower shell bodies is provided on the two opposite side walls of the first cavity 102*b*, and a sliding block is provided at a position of the first impact device relative to the position-limiting sliding groove. The sliding block of the first impact device is embedded in the position-limiting sliding groove to form a guide device, which ensures the linear displacement of the first impact device along the position-limiting sliding groove under the action of the driving force and prevents it from rotating. The first impact device is in sealed contact with the first cavity to prevent high-pressure gas from leaking from the gap, which causes a reverse force to hinder the movement of the first impact device or causes the pressure of the high-pressure gas to be decreased, and affects the movement of the second impact device.

The impact end of the first impact device may be in a blade-shaped structure or a pointed structure, such as a tapered constricted section structure or other structures that are conducive to improving the acting force per unit area.

Figure 8:
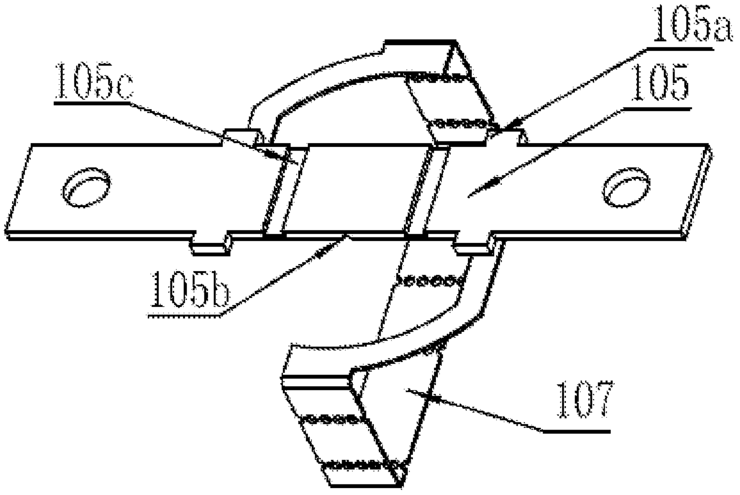
FIG. 8 is a structural schematic view of a conductor and a melt in FIG. 1 to FIG. 6.

The conductor 105 is in a long-strip plate-shaped structure. Referring to FIG. 8, at least one break weakened part 105*b* reducing the structural strength of the conductor is provided on the conductor 105. The break weakened part may be a groove formed on the surface of the conductor, such as the V-shaped groove in FIG. 1 and FIG. 3, or a U-shaped groove, or grooves in other structures; it can also be several through holes provided at intervals in a width direction of the conductor, as long as the structural strength of the conductor can be reduced, and the structure facilitates the impact device to break. Bending weakened parts 105*c* are provided at a certain distance on two sides of the break weakened part 105*b*. When the first impact device impacts the break weakened part of the conductor, the conductor is broken from the break weakened part, and after being broken, the broken conductor is bent along the bending weakened part under the action of the first impact device, so that the bent parts of the broken conductor are respectively located on two sides of the first impact device.

Figure 7:
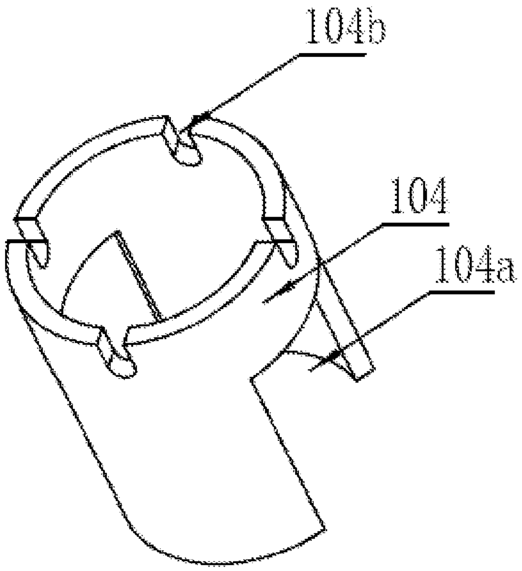
FIG. 7 is a structural schematic view of the second impact device in FIG. 1 to FIG. 6.

The second cavity 102*c* is sleeved on the second impact device 104, and the second impact device is in sealed contact with the second cavity. Referring to FIG. 7, in this embodiment, the second impact device 104 is in an annular structure, and notches 104*a* penetrating through the impact end of the second impact device are respectively provided on two opposite sides of the annular structure. When the second impact device is displaced to penetrate through the conductor, the conductor is located at the notches of the second impact device, so that the displacement of the second impact device will not result in any influence on the conductor. Several recesses 104*b* are provided at intervals at one end of the second impact device close to the excitation source. When the excitation source acts to drive the first impact device to act, the first cavity and the second cavity are communicated with the displacement of the first impact device, and the high-pressure gas generated by the excitation source can enter into the second cavity to drive the second impact device to displace. The second impact device can also be in annular structures of other shapes, such as an ellipse, a square, and the like.

Figure 4:
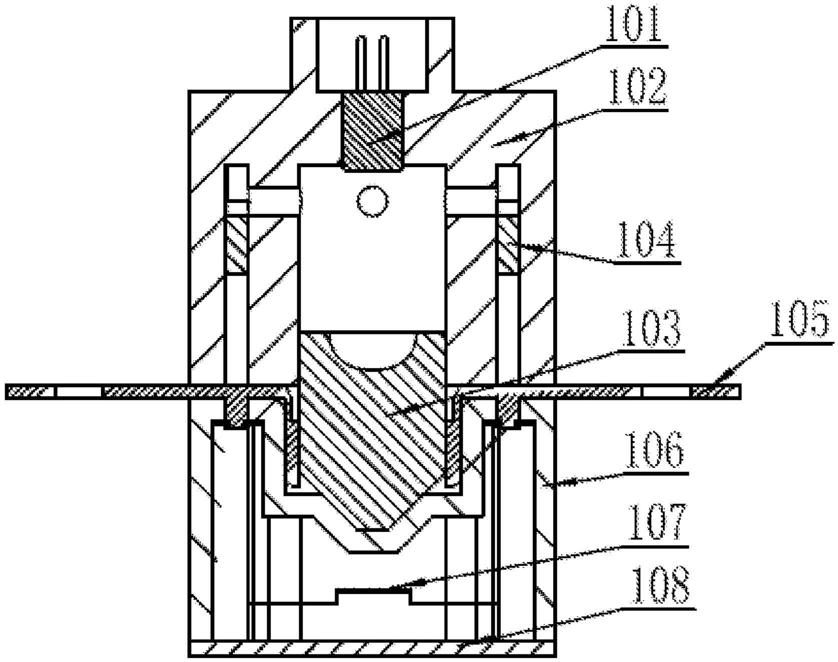
FIG. 4 is a schematic view of the sectional structure of the excitation protection device of FIG. 1 taken from a direction perpendicular to the sectional direction of FIG. 3 after the first impact device is actuated.
Figure 5:
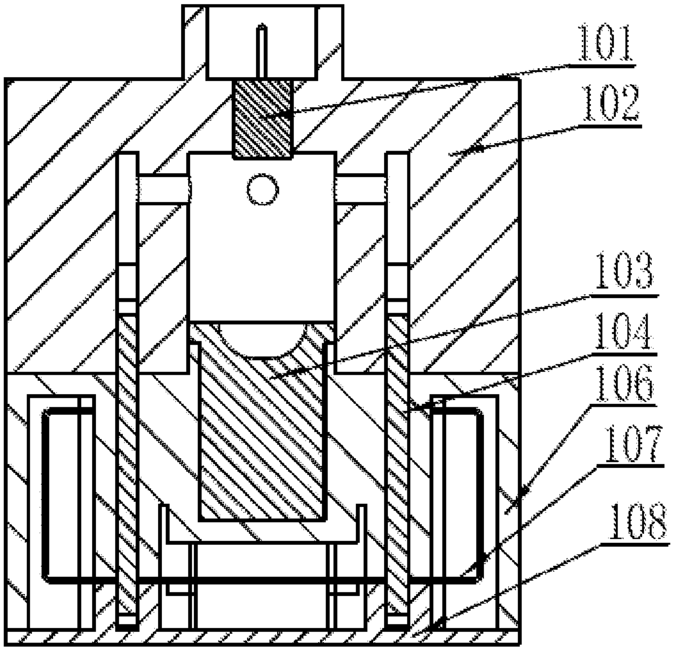
FIG. 5 is a schematic view of the sectional structure of the excitation protection device of FIG. 1 after both the first impact device and a second impact device are actuated.
Figure 6:
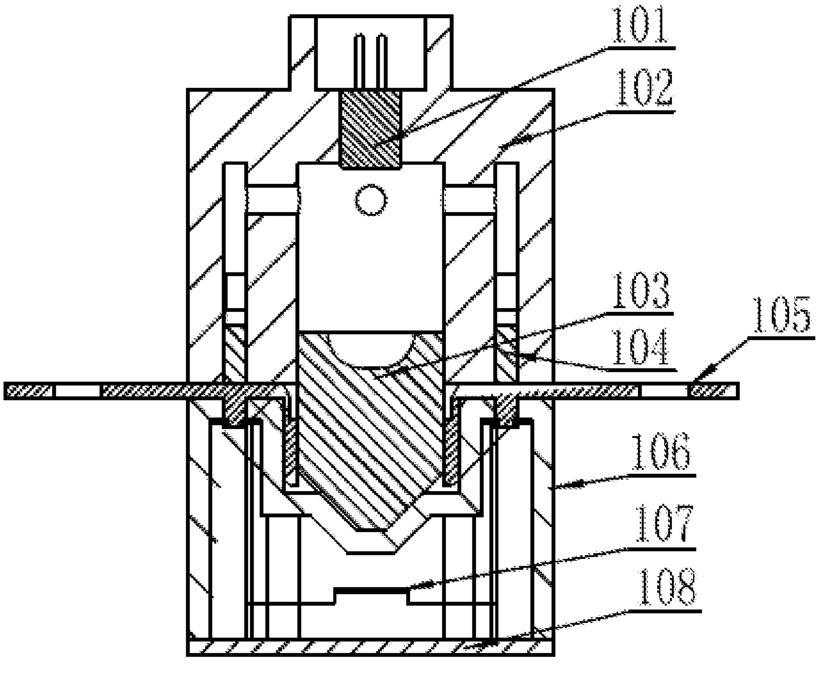
FIG. 6 is a schematic view of the sectional structure of the excitation protection device of FIG. 1 taken from a direction perpendicular to the sectional direction of FIG. 5 after both the first impact device and the second impact device are actuated.

A melt 107 is connected in parallel under the conductor, and the melt 107 is closed and mounted in the lower shell body through a bottom cover 108. A support structure for supporting the melt is provided on the bottom cover. Referring to FIG. 8, the melt 107 is in a spatial geometry shape, which is formed by bending. Two ends of the melt are respectively connected to the outside part of the bending weakened part of the conductor 105, that is, after the conductor is broken, the two ends of the melt are located on two sides of the fracture. Several fusion weakened parts and break weakened parts are provided on the melt. In this example, the fusion weakened parts are narrow necks. As shown in FIG. 4, the main body part of the melt 107 and the conductor 105 are provided in a vertically intersecting manner, so that the melt straddles the conductor in the length direction, and two ends thereof are located outside the two sides in a width direction of the conductor. The purpose of this arrangement is that when the second impact device breaks the melt, the conductor may not be affected. In order to realize the conductive connection between the melt and the conductor, the two ends of the connection between the melt and the conductor are respectively provided as curved structures to realize the parallel connection of the melt and the conductor. The connection between the melt and the conductor may be used in a manner such as bolt crimping, connecting by conductive elastic sheets, or welding. A cavity penetrating through with the second cavity is provided on the lower shell body, so that the second impact device moves to the melt to break the melt. Two sides of the part where the melt is impacted by the second impact device are supported by the lower shell body, so that the second impact device breaks the melt. A sealing cover 106*a* is provided between the melt and the conductor. The sealing cover 106*a* is in a bowl-shaped structure. The space where the melt is located is sealed by the sealing cover, and a cavity is formed in the lower shell body under the conductor by the sealing cover for the broken part to slide down and the first impact device to displace after the conductor is broken. An arc extinguishing medium is filled in the cavity where the melt is located, and the arc extinguishing medium is arc extinguishing sand or arc extinguishing gel.

The working principle of this embodiment is that when zero-current breaking is required or there is low-multiple fault current, the excitation source is triggered by an electrical signal to generate high-pressure gas, the high-pressure gas first drives the first impact device to displace, and pushes the first impact device to break the break weakened part of the conductor to form a fracture, and the arc sustaining current at the fracture is completely transferred to the melt connected in parallel with the two ends of the break weakened part. Due to the small fault current, the heat generated at the narrow neck of the melt is not enough to fuse the narrow neck and extinguish the arc; during the movement of the first impact device, the first cavity and the second cavity are gradually communicated with each other, and the amount of high-pressure gas entering the second cavity gradually increases, the high-pressure gas is filled up between the recess at the upper end of the second impact device and the top of the second cavity. When the mount of high-pressure gas is accumulated to a certain extent, the second impact device is driven to move down along the second cavity to cut off the melt, and the arc is quickly cooled and extinguished, and the circuit is cut off.

Under the medium-multiple fault current, the excitation source is triggered by the electrical signal to generate high-pressure gas, and the high-pressure gas first pushes the first impact device to break the break weakened part of the conductor to form a fracture, and the arc sustaining current at the fracture is completely transferred to the melt connected in parallel with two ends of the break weakened part. Due to the larger fault current, heat is generated through the narrow neck of the melt, and a fusing begins to form at the narrow neck of the melt, during the process of fusing, the first cavity and the second cavity are gradually communicated, the amount of high-pressure gas entering into the second cavity gradually increases and the high-pressure gas is filled up between the recess at the upper end of the second impact device and the top of the second cavity. When the amount of high-pressure gas is accumulated to a certain extent, then the second impact device is driven to move down along the second cavity to cut off the melt, the combined action of the fusing of melt and the mechanical breaking of fracture makes the arc extinguished and the circuit is cut off;

Under the high-multiple fault current, the excitation source is triggered by the electrical signal to generate high-pressure gas, the high-pressure gas first enters into the chamber of the first impact device, pushes the first impact device to break the break weakened part of the conductor to form a fracture, and the arc sustaining current at the fracture is completely transferred to the melt connected in parallel with two ends of the break weakened part. Due to the larger fault current, a large amount of heat is generated at the narrow neck of the melt and the melt is quickly fused. The arc extinguishing medium participates in the arc extinguishing, and the arc is quickly extinguished. During the movement of the first impact device, the first cavity and the second cavity are gradually communicated, and the high-pressure gas pushes the second impact device to cut off the melt, so as to form a clean physical fracture, thereby ensuring insulation after breaking.

Figure 9:
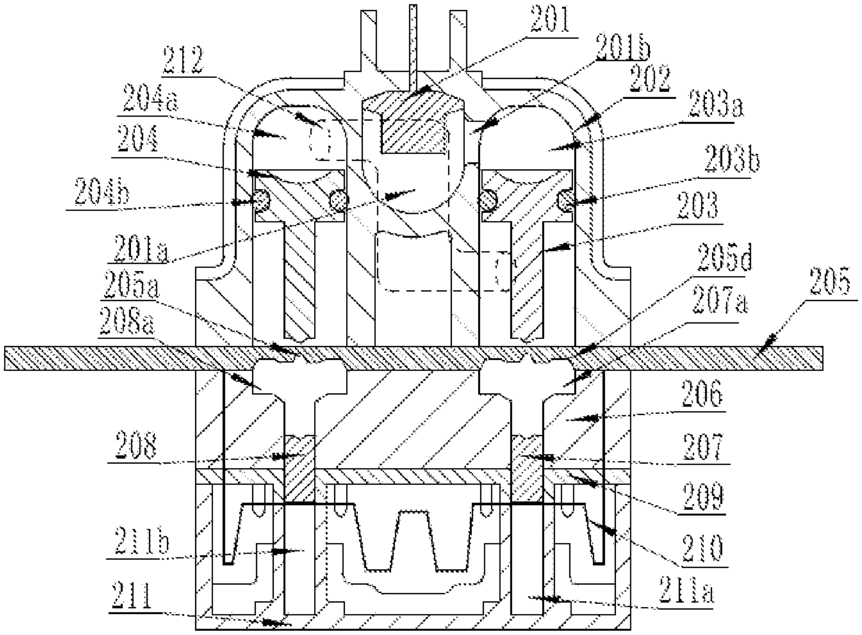
FIG. 9 is a schematic view of the sectional structure of the excitation protection device in the initial position according to other embodiments of the present disclosure.
Figure 10:
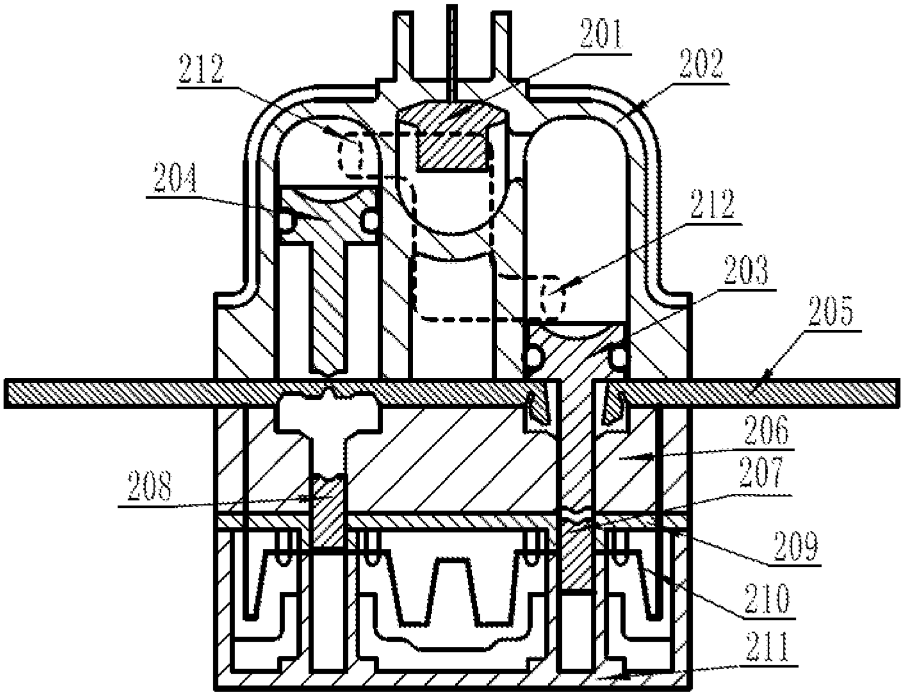
FIG. 10 is a schematic view of the sectional structure of the excitation protection device of FIG. 9 after the first impact device is actuated.
Figure 11:
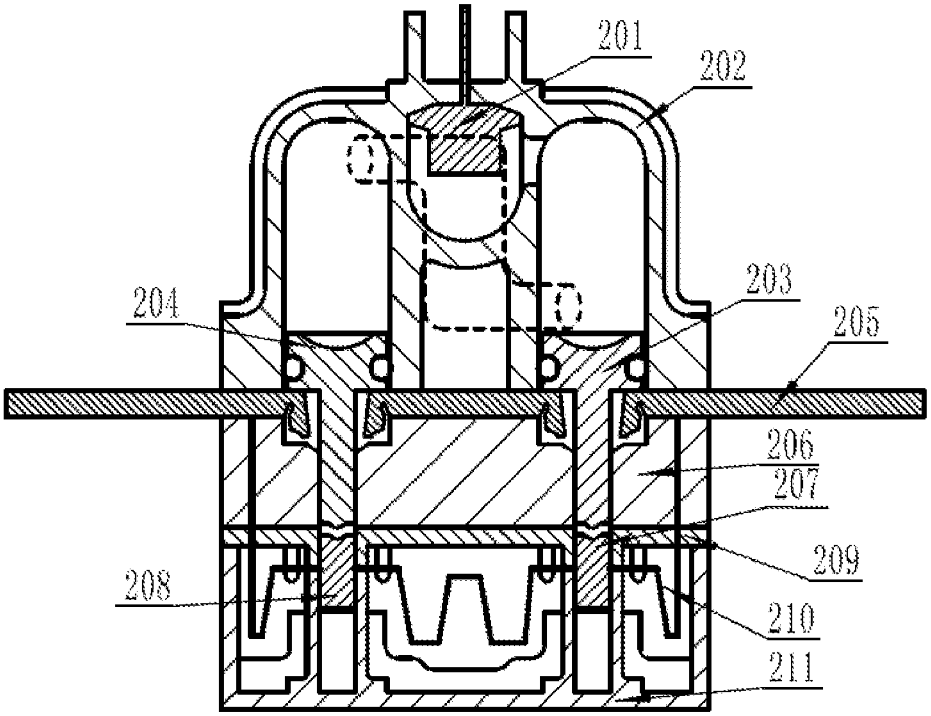
FIG. 11 is a schematic view of the sectional structure of the excitation protection device of FIG. 9 after the second impact device is actuated.

In some other embodiments of the present disclosure, referring to FIG. 9 to FIG. 11, the shell body includes an upper shell body 202 and a lower shell body 206 in a sealed connection with the upper shell body, a melt cover plate 209 and a bottom shell 211 for accommodating the melt 210 are installed under the lower shell body 206. The conductor 205 is penetrated between the contact surfaces between the upper shell body and the lower shell body. At least three mutually spaced apart cavities, that is, first cavity 203*a*, second cavity 204*a*, and closed third cavity 201*a* are provided in the upper shell body located on the side of the conductor. The first cavity 203*a* and the second cavity 204*a* penetrate through the contact surfaces of the upper shell body and the lower shell body and communicate with the fourth cavity 207*a* and the fifth cavity 208*a* provided on the lower shell body, and the conductor is penetrated through the first cavity, the second cavity, the fourth cavity and the fifth cavity. A first impact device 203 and a second impact device 204 are respectively provided in the first cavity 203*a* and the second cavity 204*a*. The tops of the first impact device and the second impact device respectively retain a certain gap with the tops of the cavities where the first impact device and the second impact device are located, so that high-pressure gas enters to drive the impact device to move. The first impact device and the second impact device are respectively in sealed contact with the cavities where the first impact device and the second impact device are located, and the sealed contact may be interference fit, or sealing devices, such as sealing rings 203*b* and 204*b*, are provided at the contact surfaces thereof. Through the sealed contact design, the upper and lower chambers are completely spaced from each other, which can avoid the influence of high-pressure gas on the insulation capacity of the fracture and prevent the fault current of the lower chamber from being introduced into the drive circuit, and simultaneously, the high-pressure gas is independently enclosed in the upper part, which can prevent the impact device from rebounding after moving in place.

The shape of the first impact device and the second impact device is similar to a T-shaped structure, and the impact end thereof is in a blade-shaped structure. An excitation source 201 is provided at the top of the third cavity 201*a*, and the excitation source 201 can be provided in the upper shell body by submerged injection molding, or can be fixedly installed in the third cavity by the form of a stepped hole or the like. The third cavity 201*a* communicates with the first cavity 203*a* through the first gas passage 201*b*, and the first gas passage 201*b* is located in the gap between the top of the first impact device and the first cavity 203*a*, so as to ensure the high-pressure gas can drive the first impact device to act at the first time when the excitation source acts. The third cavity is not communicated with the second cavity. The second cavity 204*a* communicates with the first cavity 203*a* through a second gas passage 212. The second gas passage 212 is shown by the dotted line in FIG. 9 to FIG. 11. The second gas passage may be one or two or more and can communicate with the second cavity from multiple orientations of the first cavity. The opening of the second gas passage 212 located at the first cavity 203*a* is located at an appropriate position below the top of the first impact device at the initial position, and this position satisfies: when the first impact device is not displaced in place, that is, when the first impact device does not break the conductor and the melt, the high-pressure gas generated by the excitation source will not enter the second cavity through the second gas passage 212. The purpose thereof is that the high-pressure gas must first meet the requirements of driving the first impact device to smoothly break the conductor and the melt connected in parallel with the conductor. The second gas passage 212 is located at the gap between the top of the second impact device and the top of the second cavity at the opening of the second cavity, so as to ensure that when the high-pressure gas enters the second cavity, the second impact device can be driven to act.

The definition for initial positions of the first impact device and the second impact device is realized by position-limiting structures provided between the first impact device and the cavity where the first impact device is located and between the second impact device and the cavity where the second impact device is located. The position-limiting structure may be a groove formed in a cavity, a bump is arranged on the impact device, and the position-limiting function can be achieved through the cooperation of the groove and the bump, or a position-limiting step may be provided in the cavity, and a position-limiting flange is provided on the impact device, the position-limiting function is realized by snapping the position-limiting flange on the position-limiting step; or by other snapping and position-limiting methods. The top end surfaces of the first impact device and the second impact device are provided as circular arc concave surface structures, which is conducive to pushing the impact device by high-pressure gas to move. The punching head at the lower end of the impact device is in a blade-shaped structure, which is convenient for concentrated force to cut off the conductor.

The fourth cavity 207*a* and the fifth cavity 208*a* of the lower shell body are independently provided, the fourth cavity is communicated with the first cavity in a butting manner, and the fifth cavity is communicated with the second cavity in a butting manner, so as to ensure that the first impact device and the second impact device can be displaced into the cavity of the lower shell body, after cutting off the conductor, to continue cutting off the melt. The shape of the fourth cavity and the fifth cavity is similar to the shape of the first impact device and the second impact device, that is, the upper end cavities of the fourth cavity and the fifth cavity are larger, after the first impact device or the second impact device is displaced to break the conductor and then enters into the fourth cavity or the fifth cavity, the broken part of the conductor can be bent in the fourth cavity and the fifth cavity. The two sides of the impact ends of the first impact device and the second impact device are closely matched with the corresponding fourth cavity and fifth cavity respectively, the purpose of which is to facilitate consumption of excess impact energy of the high-pressure gas and avoid shell body from being ruptured; and simultaneously, the arc can be squeezed, which plays a certain role in arc extinguishing.

Figure 18:
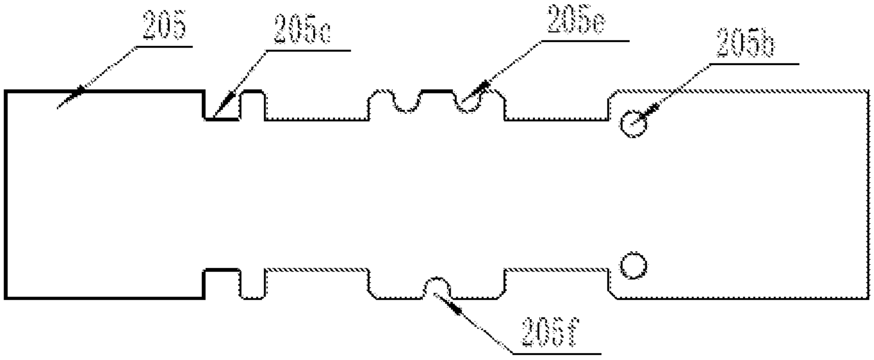
FIG. 18 is a structural schematic view of the conductor of FIG. 9 to FIG. 17.

The thickness of the conductor 205 located at the fourth cavity and the fifth cavity is reduced, and then break weakened parts 205*a* are respectively provided at the places where the thickness of the conductor 205 is reduced, and one or two sides of the break weakened parts 205*a* are provided with rotation weakened parts 205*d*. In the Embodiment 2, the rotation weakened part is in a section-reduced structure. When the first impact device or the second impact device is actuated, the corresponding break weakened part on the conductor can be cut off. After the conductor is broken, the broken part can rotate and slide down along the rotation weakened part. The break weakened part is to facilitate the impact device to cut off the conductor at the designated position, the rotation weakened part ensures that the broken conductor rotates and moves according to the predetermined trajectory. The form of the break weakened part and the rotation weakened part may be a structure with reduced strength such as "V"-shaped groove, "U"-shaped groove, reduced section or pre-rolled opening, but the structural strength of the rotation weakened part should be higher than that of the break weakened part, thereby avoiding the adverse effect caused by breaking the rotation weakened part during action. Referring to FIG. 18, in addition to the break weakened parts provided on the conductor, positioning holes 205*b* and positioning grooves 205*c* are also provided at two ends of the conductor in the shell body, and the conductor cooperates with the shell body through the positioning hole and positioning groove to fix the conductor. Simultaneously, error-proof grooves 205*e* and 205*f* are provided on two sides of the width of the conductor. The number or shape of the error-proof grooves provided on two sides are different, so as to prevent the wrong installation.

In the cavity through which the first impact device and the second impact device are displaced, at least two opposite sides of the contact surface are provided with a vertical position-limiting sliding groove, and a corresponding sliding block is provided on the first impact device or the second impact device. The sliding block is arranged in the position-limiting sliding groove, so that the first impact device and the second impact device can perform linear displacement motion along the position-limiting sliding groove to prevent the first impact device or the second impact device from rotating.

The melt 210 is connected in parallel with the conductor after passing through the lower shell body. The connection positions between the two ends of the melt and the conductor are respectively located outside the fourth cavity and the fifth cavity, so that the melt and the conductor are connected in parallel.

A melt cover plate 209 and a bottom shell 211 are fixedly provided at the bottom of the lower shell body, the melt is sealed in the bottom shell by the melt cover plate and the bottom shell 211, and the melt is supported by the bottom shell. In order to better fix the melt, a rib 209*a* for supporting the melt is provided on the cover plate, and the melt located outside the sixth cavity and the seventh cavity is arranged on the rib for further fixing. The two ends of the melt pass through the cover plate and then are electrically connected to the conductor. At a position in which the melt passes through the through hole of the cover plate, the gap between the melt and the cover plate is sealed by using the method such as sealant or a sealing ring provided in advance, such that the internal spaces of the cover plate and the bottom shell are sealed. The structure of the melt in the Embodiment 1 can be referred for the structure of the melt, which is in a spatial geometry shape. The melt passes through the sixth cavity 211*a* and the seventh cavity 211*b* on the bottom shell. The break weakened parts are provided on the melts located in the sixth cavity 211*a* and the seventh cavity 211*b*, wherein the break weakened part may be in the form of punched hole, reduced section and the like. A first push block 207 and a second push block 208 are respectively provided in the sixth cavity and the seventh cavity located above the break weakened part of the melt, and the end surface of the first push block and the second push block in contact with the melt is a plane, and the first push block and the second push block are respectively in sealed contact with the sixth cavity and the seventh cavity where the first push block and the second push block are located, thereby sealing the cavity where the melt is located. The initial positions of the first push block and the second push block are fixed by position-limiting structures between the first push block and the bottom shell and between the second push block and the bottom shell. After the impact device breaks the conductor, the push block can be driven to break the melt. In addition to the break weakened parts, several narrow necks are also provided on the melt. The narrow necks may be located on the melt between the first push block and the second push block. Cushion pads (not shown in the figure) are provided at the bottoms of the sixth cavity and the seventh cavity. After the impact device drives the push block to break the melt, the cushion pad can absorb most of the kinetic energy brought by the push block and avoid the bottom shell from being damaged. An arc extinguishing medium is filled in the cavity formed by the cover plate and the bottom shell. The arc extinguishing medium is arc extinguishing sand or arc extinguishing gel, and the melt is located in the arc extinguishing medium. The cover plate, the melt and the bottom shell, as an independent part, are assembled in advance and then connected fixedly with the lower shell body.

Working principle is as follows.

When zero-current breaking is required or there is low multiple fault current, the excitation source is triggered by an electrical signal to generate high-pressure gas. The high-pressure gas first enters the first cavity through the first gas passage, and pushes the first impact device to displace for breaking the break weakened part of conductor to form a fracture after overcoming the position-limiting structure, the arc sustaining current at the fracture is completely transferred to the melt connected in parallel with the two ends of the break weakened part. Due to the small fault current, the heat generated at the narrow neck of the melt is not enough to fuse the narrow neck and extinguish the arc. The first impact device continues to move to cut off the melt, the arc is quickly extinguished, and the circuit is cut off. The first impact device moves in place, the second gas passage communicates with the first gas passage, and the high-pressure gas passes through the first gas passage, the first cavity and the second gas passage and enters into the second cavity for circulation and accumulation, after the gas pressure is large enough, the second impact device is pushed to break the conductor and the melt in sequence to form a clean physical fracture, thereby ensuring insulation after breaking.

Under the medium-multiple fault current, the excitation source is triggered by the electrical signal to generate high-pressure gas. The high-pressure gas first enters the first cavity through the first gas passage, and pushes the first impact device to break the break weakened part of conductor to form a fracture, the arc sustaining current at the fracture is completely transferred to the melt connected in parallel with the two ends of the break weakened part. Due to the larger fault current, the heat is generated at the narrow neck of the melt, and the narrow neck of the melt starts to be fused. In the process of fusing, the first impact device continues to move to cut off the melt, the narrow neck is not completely fused at this time, there may still be arc sustaining at the first fractured position of the melt. The first impact device moves in place, the second gas passage communicates with the first gas passage, and the high-pressure gas passes through the first gas passage, the first cavity and the second gas passage and circulates and accumulates towards the second cavity, after the gas pressure is sufficient, the second impact device is pushed to break the conductor and the melt in sequence, the combined action of the fusing of melt and the mechanical breaking of the fracture makes the arc extinguished and the circuit is cut off.

Under the high-multiple fault current, the excitation source is triggered by the electrical signal to generate high-pressure gas. The high-pressure gas first enters the first cavity through the first gas passage, and pushes the first impact device to break the break weakened part of conductor to form a fracture, the arc sustaining current at the fracture is completely transferred to the melt connected in parallel with the two ends of the break weakened part. Due to the larger fault current, a large amount of heat is generated at the narrow neck of the melt, which is quickly fused. The arc extinguishing medium participates in the arc extinguishing, the arc is quickly extinguished, and the circuit is cut off. The first impact device continues to move to cut off the melt without current, and then the first impact device moves in place, the second gas passage communicates with the first gas passage, and the high-pressure gas passes through the first gas passage, the first cavity and the second gas passage and circulates and accumulates towards the chamber of second impact device, after the gas pressure is sufficient, the second impact device is pushed to break the conductor and the melt in sequence to form a clean physical fracture, thereby ensuring insulation after breaking.

Figure 12:
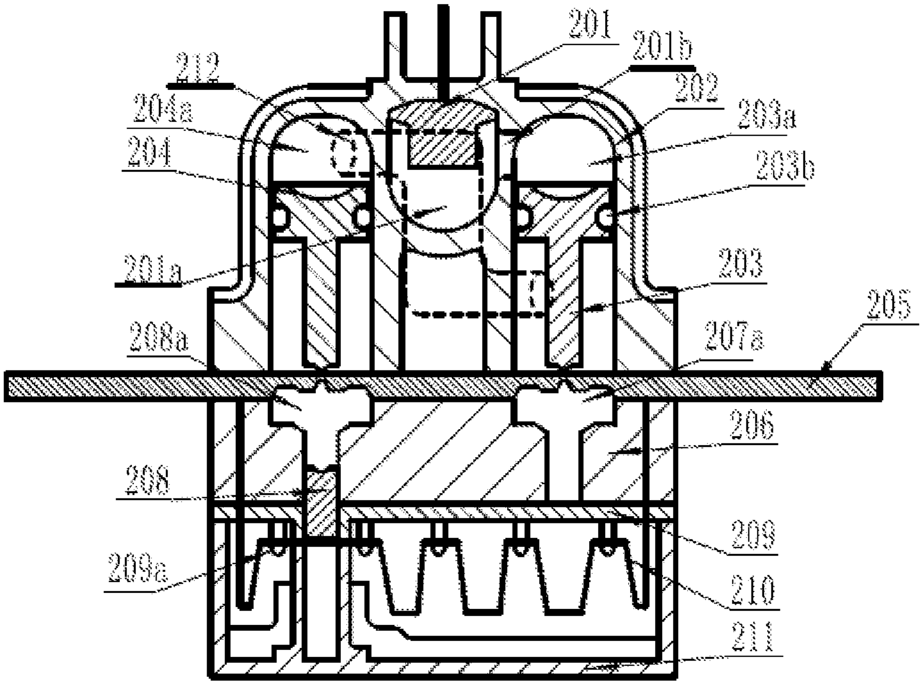
FIG. 12 is a schematic view of the sectional structure of a variant of the excitation protection device of FIG. 9 in the initial position.
Figure 13:
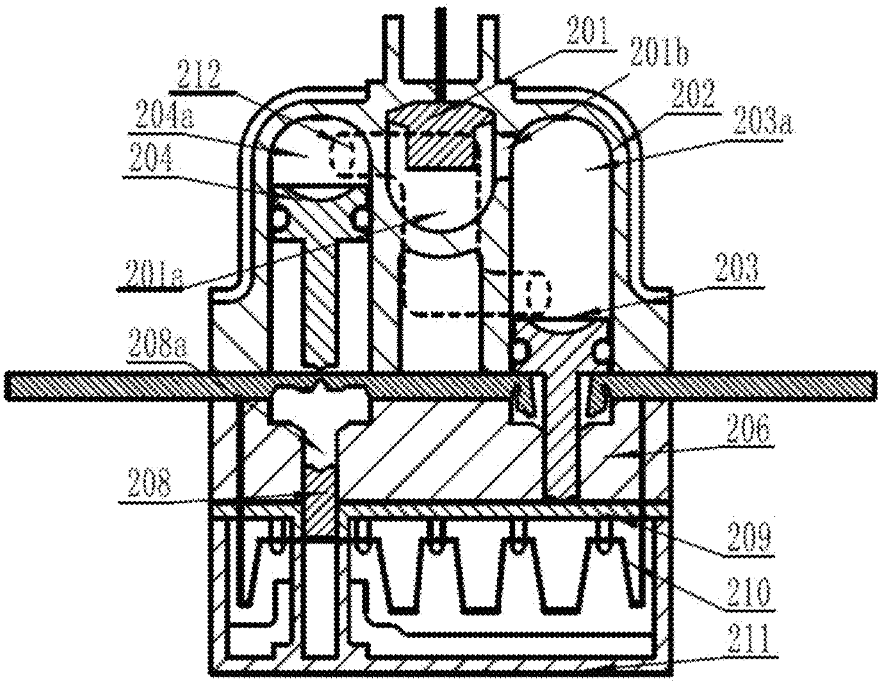
FIG. 13 is a schematic view of the sectional structure of the excitation protection device of FIG. 12 after the first impact device is actuated.
Figure 14:
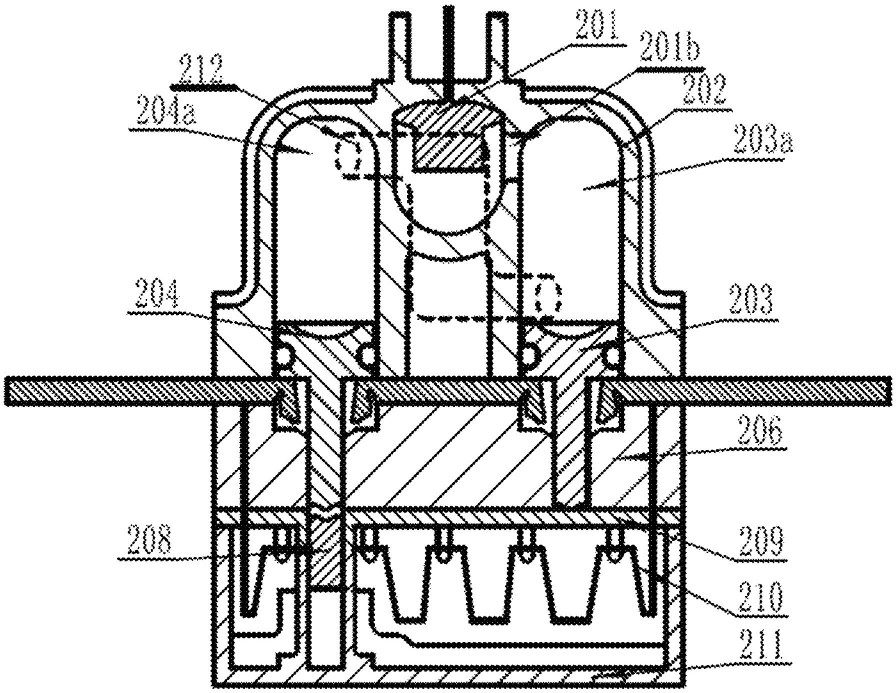
FIG. 14 is a schematic view of the sectional structure of the excitation protection device of FIG. 12 after the second impact device is actuated.

The present disclosure also provides a variant of the above-mentioned example. Referring to FIG. 12 to FIG. 14, a sixth cavity is not provided on the bottom shell 111 and the melt cover plate 209, and the lower end surface of the fourth cavity 207*a* is located at the bottom of the lower shell body 206. The first impact device 203 only needs to break the conductor 205, and the second impact device 204 breaks the conductor and the melt in sequence. However, in order to better fix the melt 210, a rib 209*a* for fixing the melt is additionally provided on the melt cover plate where the sixth cavity is not provided, and the shape of the melt is also slightly changed. The other structures are the same as those of Embodiment 2.

Working principle is that the excitation source 201 receives an external signal to act, and generates high-pressure gas to enter the first cavity 203*a* through the first gas passage 201*a*, and drives the first impact device 203 to displace and break the break weakened part of the conductor 205, and then the first gas passage is communicated with the second gas passage 212, and the high-pressure gas enters into the second cavity 204*a* to drive the second impact device 204 to break the conductor and the melt in sequence.

Figure 15:
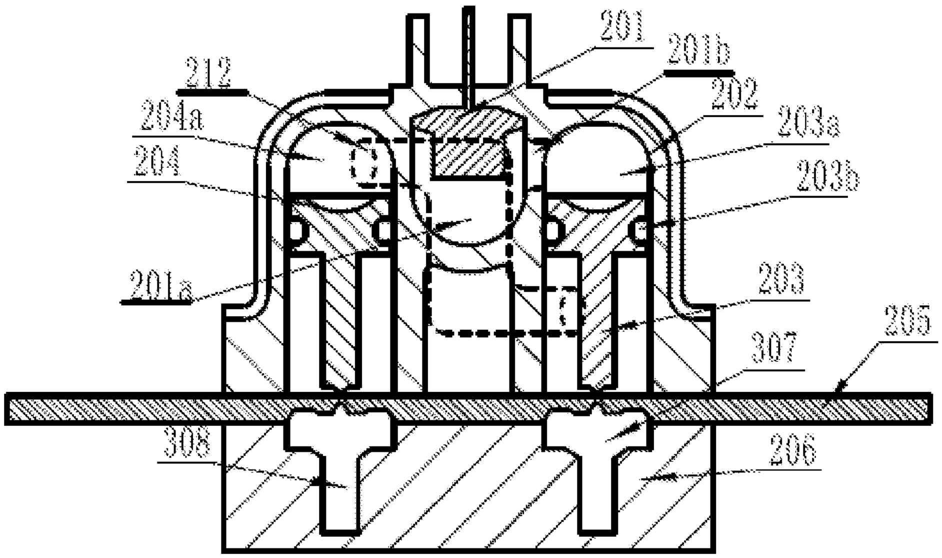
FIG. 15 is a schematic view of the sectional structure of the variant of the excitation protection device of FIG. 12 in the initial position.
Figure 16:
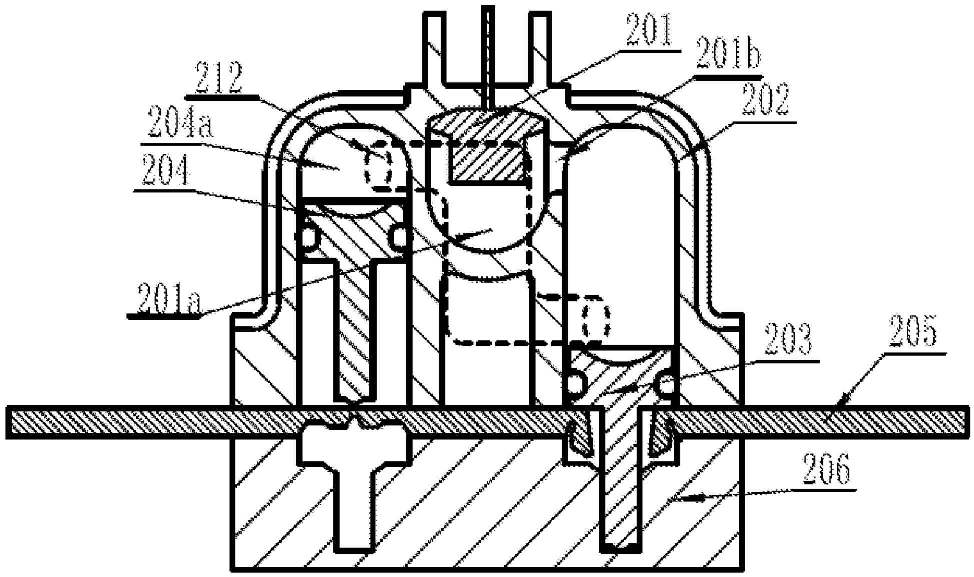
FIG. 16 is a schematic view of the sectional structure of the excitation protection device of FIG. 15 after the first impact device is actuated.
Figure 17:
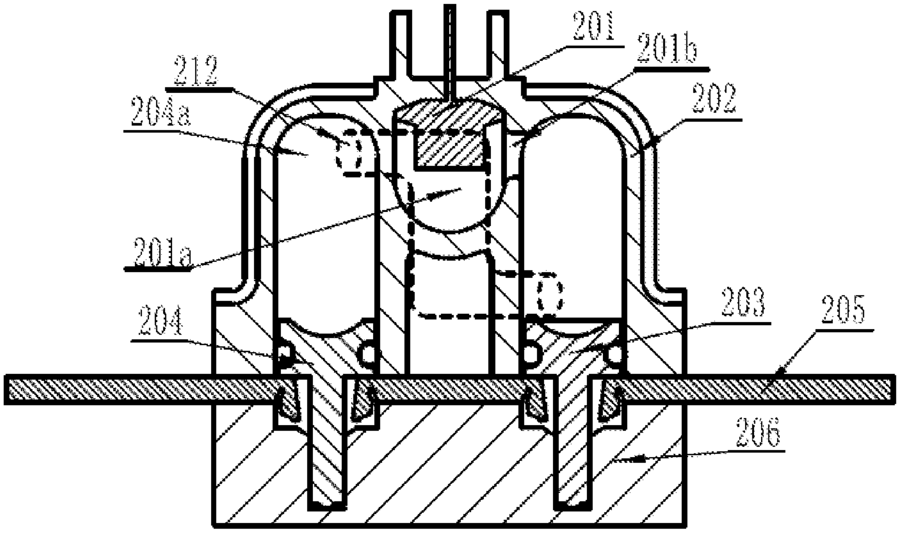
FIG. 17 is a schematic view of the sectional structure of the excitation protection device of FIG. 15 after the second impact device is actuated.

The present disclosure also provides additional variations of the above-mentioned embodiments. Referring to FIG. 15 to FIG. 17, in this embodiment, the conductor is not connected in parallel with the melt, the melt cover plate and the bottom shell are removed, and a fourth cavity 307 and a fifth cavity 308 are provided on the lower shell body 206, the fourth cavity 307 and the fifth cavity 308 are not penetrated through the bottom of the lower shell body. Other structures are the same as structures in the above-mentioned embodiments.

Working principle is that the excitation source 201 acts, and the high-pressure gas enters into the first cavity 203*a* through the first gas passage 201*a*, drives the first impact device 203 to act and break the conductor 205, and then the second gas passage 212 communicates with the first gas passage 201*a*, and the high-pressure gas enters the second cavity 204*a* to drive the second impact device 204 to act to break the conductor.

In the above-mentioned embodiment, the impact device is not limited to two, and multiple impact devices located in independent chambers may be provided; the excitation source can be directly communicated with the cavity where the multiple impact devices are located through the first gas passage, each impact device in which the cavity is directly communicated with the excitation source is the first impact device; the impact device located in the cavity being directly communicated with the cavity where the first impact device is located through the second gas passage is the second impact device, and the impact device located in the cavity being directly communicated with the cavity where the second impact device is located through the third gas passage is the third impact device, and so on. The gas passages of the cavities where the first impact device, the second impact device, and the third impact device are located are communicated in series. Therefore, the first impact device, the second impact device, and the third impact device act successively in the order that the high-pressure gas flows. As long as the high-pressure gas provided by the excitation source is sufficient to push all impact devices to act, then in theory there can be multiple impact devices acting simultaneously or sequentially.

Figure 19:
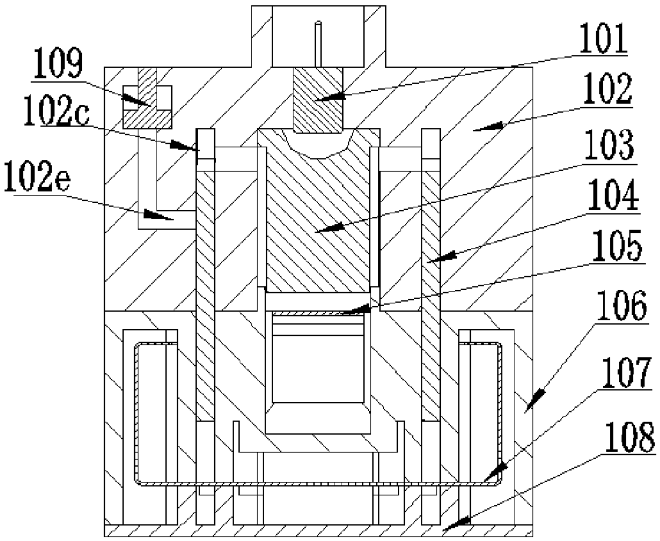
FIG. 19 is a structural schematic view of the excitation protection device with an indicator device added in a normal state of FIG. 1 to FIG. 17.
Figure 20:
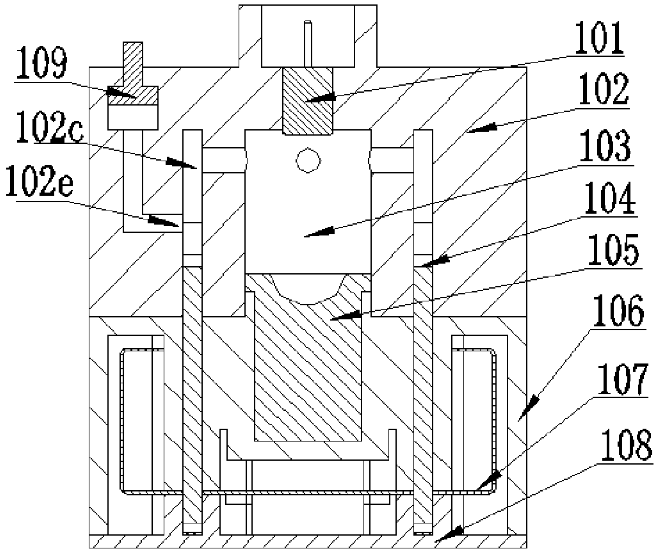
FIG. 20 is a structural schematic view of the excitation protection device with the indicator device added in FIG. 19 after actions are completely completed.

In still other embodiments of the present disclosure, on the basis of the structure of the excitation protection device provided in the above-mentioned embodiments, an indicator device may also be added. Referring to FIG. 19, taking one of the above-mentioned embodiments as an example, a third cavity is provided in the upper shell body outside the second cavity 102*c*, an opening of one end of the third cavity is located on the outer surface of the upper shell body and communicates with the outside, the other end communicates with the second cavity 102*c* through the gas passage 102*e*. An indicator device 109 is interference fit in the third cavity. In this embodiment, the indicator device 109 is in an inverted T-shaped structure, one end of the large diameter thereof is in an interference fit with the third cavity and is located at one end connected to the gas passage, and one end of small diameter thereof is located in the opening end on the outer surface of the upper shell body. A position-limiting mechanism is provided at the contact surface between the indicator device and the third cavity. In this embodiment, the position-limiting mechanism is in an interference fit, and the purpose of the position-limiting mechanism is to make the indicator device fixed in the third cavity to maintain the initial position, thereby avoiding malfunction of the indicator device, and giving wrong indication.

The opening position of the gas passage 102*e* at the second cavity 102*c* satisfies that the opening of the gas passage 102*e* at the second cavity 102*c* can be exposed only when the second impact device 104 is displaced to the dead center position after breaking the melt, and when the second impact device 104 is not displaced to the dead center position, the opening of the gas passage 102*e* at the second cavity 102*c* is closed by the second impact device.

The working principle of this embodiment is that: when the first impact device and the second impact device are completely displaced in place, the opening of the gas passage 102*e* at the second cavity 102*c* is exposed, and the high-pressure gas enters the third cavity through the gas passage 102*e*, drives the indicator device 109 to overcome the frictional force of the interference fit so that one end of the indicator device extends out of the shell body of the excitation protection device to be connected to the indicator circuit located outside the excitation protection device, and the other end is still in interference fit in the third cavity. The indicator device is connected to the indicator circuit to remind that the main circuit has a fault, indicating that the excitation protection device has completed the protection action, and the main circuit needs to be repaired in time.

The purpose of providing the indicator device is to indicate the failure of the main circuit, and to indicate that the action of the excitation protection device is completed; therefore, the indicator device only needs to be communicated with the cavity where the last actuated impact device is located through the gas passage. When the individual impact devices act simultaneously, it is sufficient that the indicator device is communicated with the cavity where one of the impact devices is located through the gas passage. The opening position of the gas passage of the indicator device in the cavity where the impact device is located must satisfy that the opening of gas passage of the indicator device can be exposed and the indicator device can act only after all the actions of the impact device are completed.

In still other embodiments of the present disclosure, the cavity where the excitation source is located may respectively be communicated with the cavities where the individual impact devices are located through gas passages. When the excitation source receives the excitation signal to act, the high-pressure gas generated thereof can respectively enter the cavities where the individual impact devices are located through the gas passages simultaneously, and drives the individual impact devices to act simultaneously.

In the above embodiments, the excitation source is an electronic ignition device that can generate high-pressure gas; the present disclosure also provides other embodiments, wherein the excitation source is a hydraulic device capable of receiving an external excitation signal, and by receiving the excitation signal, the high-pressure liquid is released, the high-pressure liquid enters the cavity where the corresponding impact device is located through the liquid flow passage, that is, the gas passage in the above-mentioned embodiments, and drives the impact device to act. When the hydraulic device is used, the high-pressure fluid released must be an insulating fluid. In the embodiment, only the type of the excitation source is changed, and the rest of the structures are all the same as those of the above-mentioned embodiments.

In some embodiments of the present disclosure, the shell body may further be provided with at least one valve structure, and the valve structure may be selected from a pressure regulating valve, a one-way valve, a reversing valve or a pressure relief valve.

In some embodiments of the present disclosure, each of the valve structures may be driven by the excitation source, the impact device, and the broken conductor, wherein when two or more valve structures are provided, all of the valve structures may be driven by the same one of the excitation source, the impact device, and the broken conductor, or two of all of the valve structures may be respectively driven by different two of the excitation source, the impact device, and the broken conductor.

It can be understood that the specific implementation form of the above-mentioned valve structure is not limited to this, and any other form of valve structures may also be used without departing from the spirit and scope of the present disclosure.

Some specific embodiments of the valve structure of the present disclosure will be described in detail below with reference to FIG. 21 to FIG. 25.

Figure 21:
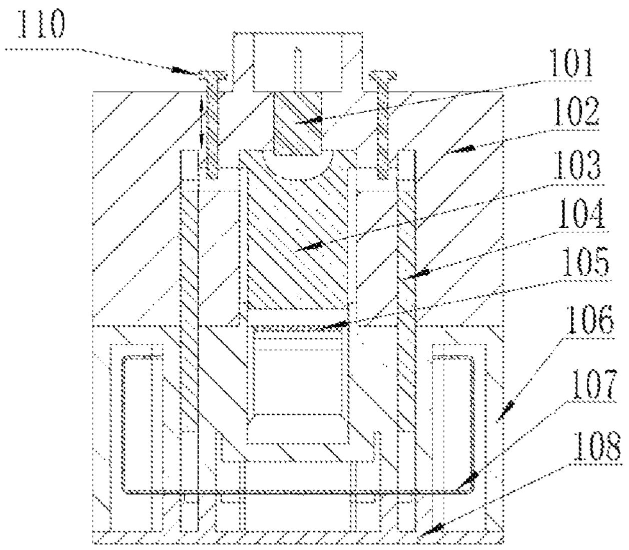
FIG. 21 is a sectional schematic view of a pressure regulating valve 110.
Figure 22A:
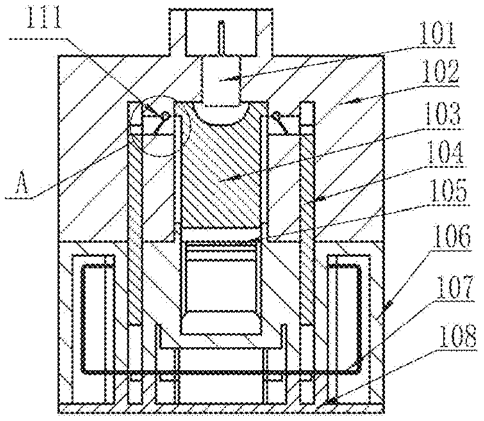
FIG. 22 (*a*) is a sectional schematic view of a one-way valve according to an embodiment of the present disclosure, and the one-way valve is in a closed state.
Figure 22B:
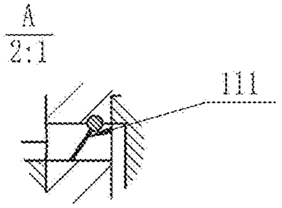
Figure 22C:
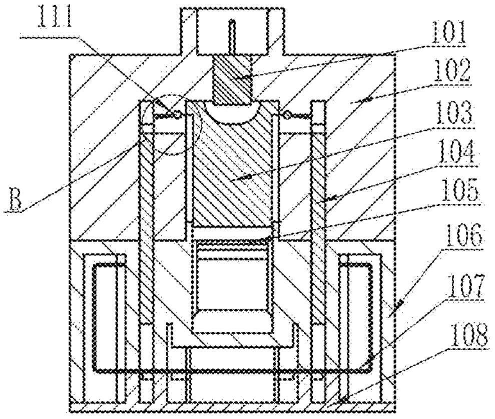
Figure 22D:
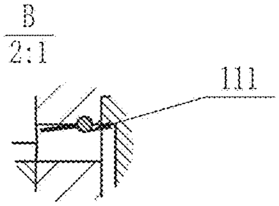
Figure 23A:
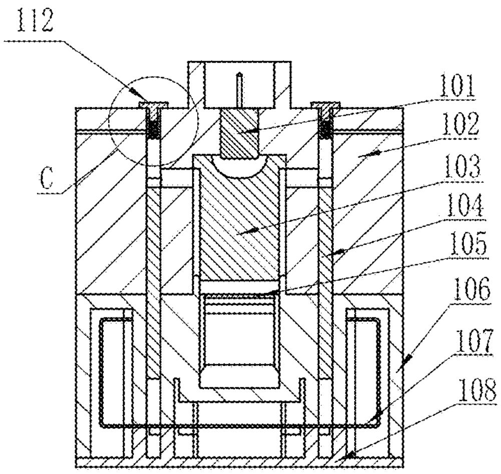
FIG. 23 (*a*) is a sectional schematic view of a pressure relief valve driven by an excitation source according to an embodiment of the present disclosure.
Figure 23B:
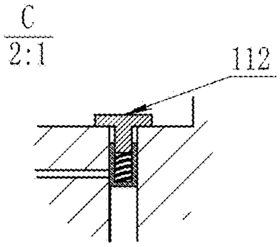
Figure 23C:
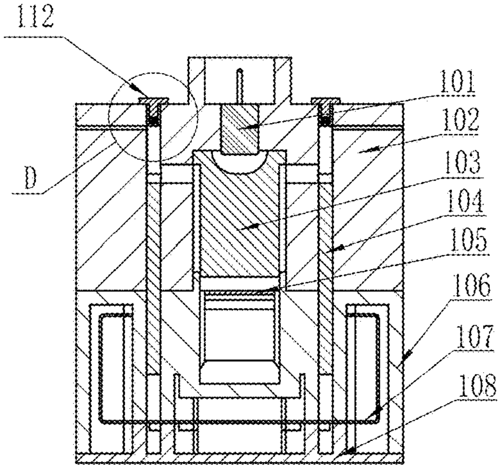
Figure 23D:
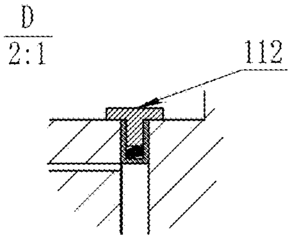
Figure 24A:
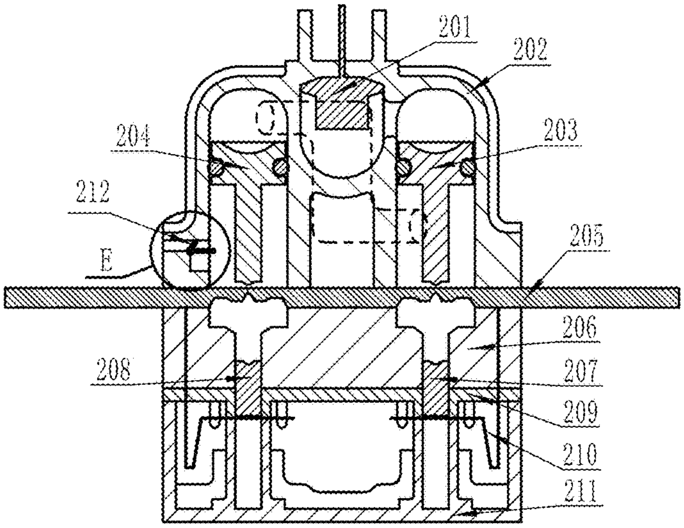
FIG. 24 (*a*) is a sectional schematic view of a pressure relief valve driven by an impact device.
Figure 24B:
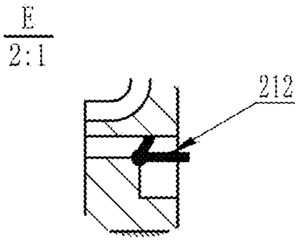
Figure 24C:
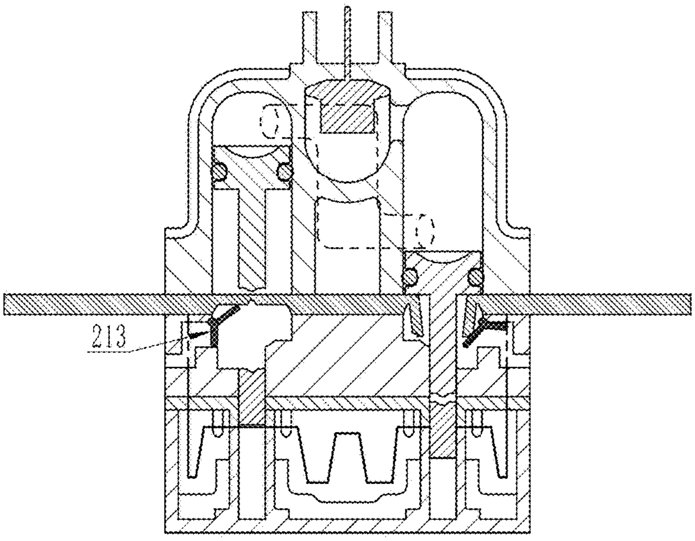
Figure 24D:
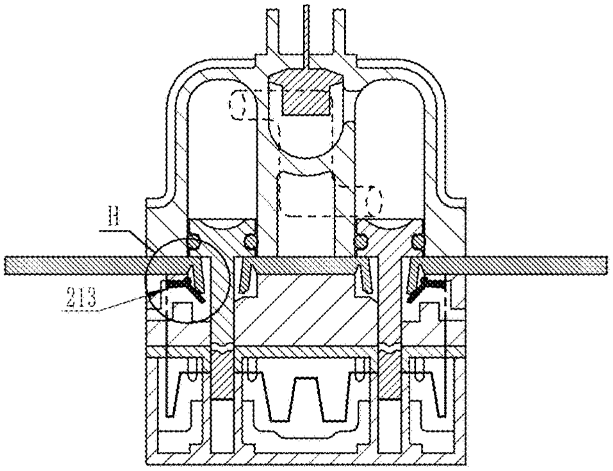
Figure 24E:
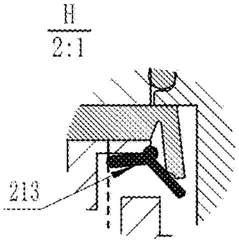
Figure 25A:
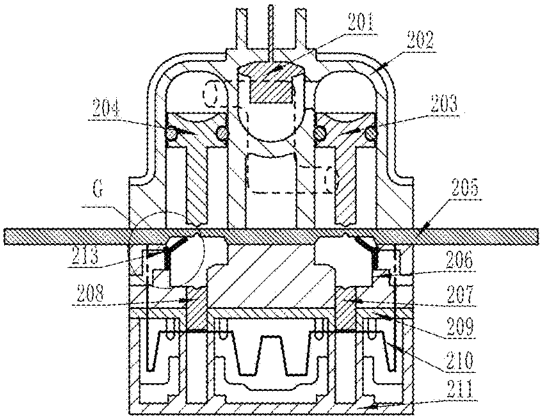
FIG. 25 (*a*) is a sectional schematic view of the pressure relief driven through a broken conductor according to an embodiment of the present disclosure.
Figure 25B:
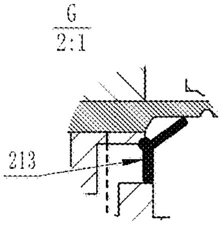
Figure 25C:
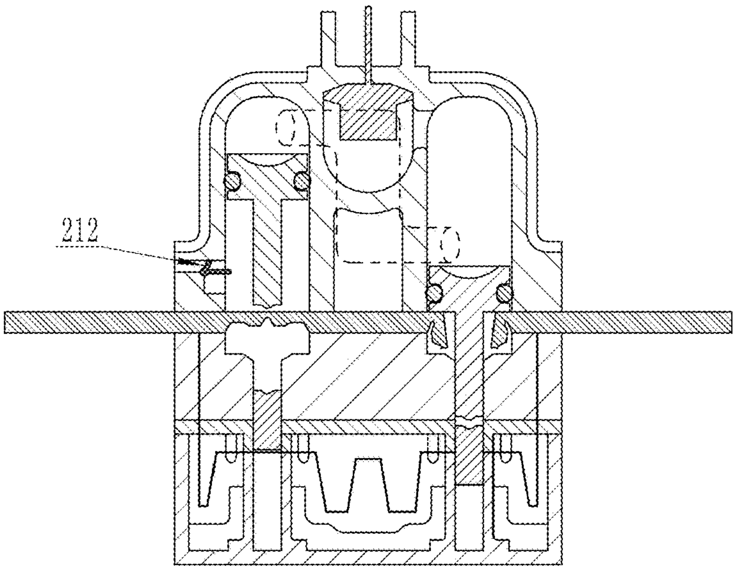
Figure 25D:
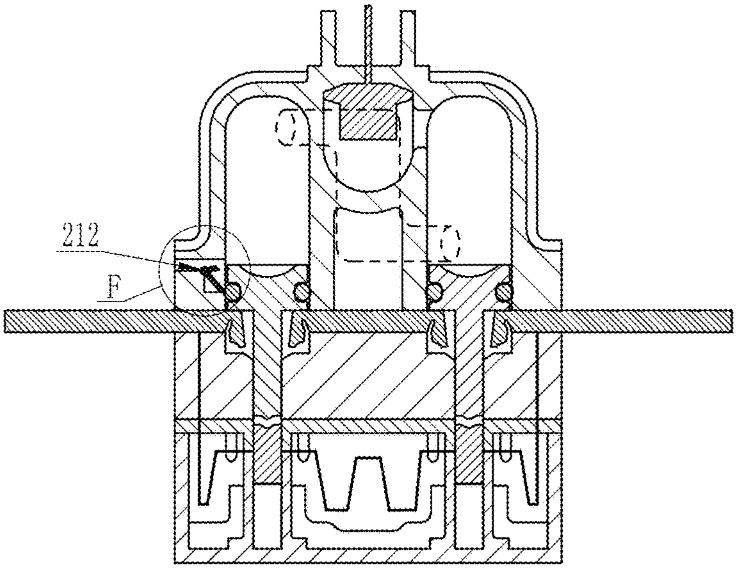
Figure 25E:
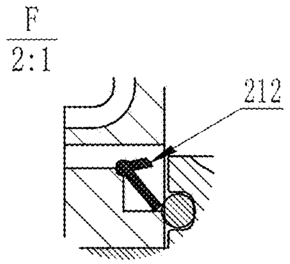

Referring to FIG. 21, FIG. 21 is a sectional schematic view of a pressure regulating valve 110 as some embodiments of a valve structure. As shown in FIG. 21, the pressure regulating valve 110 may be provided on the flow passage formed on the upper shell body. The pressure regulating valve 110 has a thread and can be screwed up and down to adjust the size of the opening of the flow passage, thereby adjusting the gas flow to achieve pressure regulating function. Therefore, the pressure regulating valve 110 can control the time interval of the movement of each impact device and adjust the time-delay parameter, thereby facilitating the breaking. The number of pressure regulating valves may be provided to be at least one according to specific needs.

FIG. 22 (*a*) is a sectional schematic view of a one-way valve according to an embodiment of the present disclosure, and the one-way valve is in a closed state; FIG. 22 (*b*) is a partial enlargement of FIG. 22 (*a*) in a ratio of 2:1; FIG. 22 (*c*) is sectional schematic view of the one-way valve according to an embodiment of the present disclosure, and the one-way valve is in an open state; FIG. 22 (*d*) is a partial enlargement of FIG. 22 (*c*) in a ratio of 2:1; the one-way valve 111 may be provided in the flow passage opening of the upper shell body and formed into a hinged structure. When the gas enters another cavity from the flow passage opening, the one-way valve 111 in a hinged structure rotates to make the flow passage opening opened (as shown in FIG. 22 (*b*)) under the driving of the gas pressure, thereby realizing one-way flow. In this way, it is possible to prevent the gas from flowing back and causing the pressure in the other cavity to be insufficient to push the impact device to move. The number of one-way valves may be provided to be at least one according to specific needs.

In addition, FIG. 23 (*a*) to FIG. 25 (*e*) also show sectional schematic views of pressure relief valves as further embodiments of valve structures.

It can be understood that the valve structure disclosed in the present disclosure may be driven in various manners, and the present disclosure does not make any limitation on the driving manner of the valve structure. For example, in some embodiments, the valve structures of the present disclosure may be driven by an excitation source, and/or impact devices, and/or a broken conductor, as previously described. Next, the driving manner of the valve structure of the present disclosure will be described in detail by taking the pressure relief valve as an example.

FIG. 23 (*a*) is a sectional schematic view of a pressure relief valve driven by an excitation source according to an embodiment of the present disclosure; FIG. 23 (*b*) is a partial enlargement of FIG. 23 (*a*) in a ratio of 2:1; FIG. 23 (*c*) is a sectional schematic view of the pressure relief valve driven by the excitation source according to another embodiment of the present disclosure; FIG. 23 (*d*) is a partial enlargement of FIG. 23 (*a*) in a ratio of 2:1; the pressure relief valve 112 may be provided in the fluid chamber of the upper shell body and provided with a spring structure. When the gas pressure is too large, under the action of the gas pressure, the spring structure is compressed so that the outflow hole communicates with the gas chamber, and the excess gas can be discharged from the outflow hole, thereby realizing the overflow effect. In this way, through the pressure relief valve, the shell body can be protected from damage to the shell body due to excessive gas pressure.

FIG. 24 (*a*) is a sectional schematic view of a pressure relief valve driven by an impact device; FIG. 24 (*b*) is a partial enlargement of FIG. 24 (*b*) in a ratio of 2:1; FIG. 24 (*c*) is a sectional schematic view of the pressure relief valve when the first impact device is in action ending state; FIG. 24 (*d*) is a sectional schematic view of the pressure relief valve when the first impact device and second impact device being in action ending state; FIG. 24 (*e*) is a partial enlargement of FIG. 24 (*d*) in a ratio of 2:1; the pressure relief valve 212 is provided on the displacement path of the impact device in the upper shell body, and is formed as a rotating shaft structure. During the displacement process of the impact device, the pressure relief valve 212 is driven by the impact device to rotate to open the outflow hole, so that the excess gas can flow out from the outflow port to play an overflow role, thereby preventing the shell body from being damaged by excessive gas pressure.

FIG. 25 (*a*) is a sectional schematic view of the pressure relief driven through a broken conductor according to an embodiment of the present disclosure; FIG. 25 (*b*) is a partial enlargement of FIG. 25 (*a*) in a ratio of 2:1; FIG. 25 (*c*) is a sectional schematic view of the pressure relief driven through the broken conductor when the first impact device is in action ending state; FIG. 25 (*d*) is a sectional schematic view of the pressure relief driven though the broken conductor when the first impact device and second impact device being in action ending state; FIG. 25 (*e*) is a partial enlargement of FIG. 25 (*d*) in a ratio of 2:1; the pressure relief valve 213 is provided on the path in which the conductor is broken in the lower shell body, and is formed as a rotating shaft structure. When the broken part of the conductor is driven by the impact device to be bended, the pressure relief valve 213 is driven by the conductor to rotate to open the outflow hole, so that the pressured gas generated by the arc burning during the breaking can flow out from the outflow port to avoid damage to the shell body.

The number of pressure relief valves may be provided to be at least one according to specific needs.

The gas passage in the above embodiments and the liquid flow passage in this embodiment are collectively defined as a flow passage in the present disclosure. When the gas in this embodiment is replaced with liquid, it still falls within the protection scope of the present disclosure.

INDUSTRIAL APPLICABILITY

The present disclosure provides an excitation protection device acting step by step with a single excitation source, which comprises a shell body, an excitation source, impact devices and a conductor, wherein at least two impact devices respectively located in different cavities are provided in the shell body, one side of the impact device is provided with one excitation source, and the impact device and the excitation source are respectively in sealed contact with the cavities where the impact device and the excitation source are located; and the excitation source drives the impact devices to displace simultaneously or successively, and at least one of the impact devices breaks the conductor during the displacement process. The excitation protection device of the present disclosure can be used for the protection of battery packs and load circuits of electric vehicles, or used in other power control circuits. The excitation protection device of the present disclosure has excellent resistance to current impact; the arc extinguishing capability is improved, and rapid protection can be realized; the insulation performance after breaking is excellent; the sequence and time difference of the breaking of multiple fractures can be adjusted in a wide range, which is beneficial to the successful breaking of the excitation protection device and the improvement of the breaking capacity, thereby improving the reliability of the product.

Furthermore, it will be appreciated that the excitation protection device acting step by step with a single excitation source is reproducible and can be used in a variety of industrial applications. For example, the excitation protection device acting step by step with a single excitation source in the present disclosure can be used in the technical fields of power control and electric vehicle.

What is claimed is:

1. An excitation protection device acting step by step with a single excitation source, comprising a shell body, an excitation source, impact devices and a conductor, wherein at least two impact devices respectively located in different cavities are provided in the shell body, one side of the impact devices are provided with one excitation source, and the impact devices and the excitation source are respectively in sealed contact with the cavities where the impact devices and the excitation source are located; and the excitation source drives the impact devices to displace simultaneously or successively, and at least one of the impact devices breaks the conductor during a displacement process.

2. The excitation protection device acting step by step with a single excitation source according to claim 1, wherein the shell body is provided with at least one valve structure, and the valve structure is selected from a pressure regulating valve, a one-way valve, a reversing valve or a pressure relief valve.

3. The excitation protection device acting step by step with a single excitation source according to claim 2, wherein each valve structure is driven by the excitation source, or the impact devices, or a broken conductor, wherein when two or more valve structures are provided, all the valve structures are driven by a same one of the excitation source, the impact devices, and the broken conductor, or two valve structures of all the valve structures are respectively driven by different two of the excitation source, the impact devices, and the broken conductor.

4. The excitation protection device acting step by step with a single excitation source according to claim 1, wherein the shell body comprises an upper shell body and a lower shell body provided in a sealed connection with the upper shell body, the conductor is penetrated between contact surfaces of the upper shell body and the lower shell body, and two ends of the conductor are located outside the shell body.

5. The excitation protection device acting step by step with a single excitation source according to claim 1, wherein at least one melt is connected in parallel with the conductor.

6. The excitation protection device acting step by step with a single excitation source according to claim 5, wherein at least one of the impact devices breaks the conductor; at least one of the impact devices breaks the melt or sequentially breaks the conductor and the melt.

7. The excitation protection device acting step by step with a single excitation source according to claim 6, wherein a fusion weakened part and a break weakened part are provided on the melt, and the break weakened part is located at a position broken by an impact device.

8. The excitation protection device acting step by step with a single excitation source according to claim 7, wherein a push block is provided in a cavity near the impact device at the break weakened part of the melt, a position-limiting structure configured to limit an initial position of the push block is provided between the push block and the cavity where the push block is located.

9. The excitation protection device acting step by step with a single excitation source according to claim 7, wherein the fusion weakened part is located in a closed cavity filled with an arc extinguishing medium.

10. The excitation protection device acting step by step with a single excitation source according to claim 9, wherein in a case that a cavity where the excitation source is located is respectively communicated with cavities where individual impact devices are located, when the excitation source acts, the impact devices are driven to act simultaneously or successively; or, in a case that the cavity where the excitation source is located is communicated with a cavity where one of the impact devices is located, the cavities where the individual impact devices are located are respectively communicated in series through flow passages, when the excitation source acts, the impact devices are driven to act successively.

11. The excitation protection device acting step by step with a single excitation source according to claim 5, wherein the shell body further comprises a shell body of the melt provided at a bottom of the shell body, the melt is penetrated in the shell body of the melt, and two ends of the melt pass through the shell body of the melt and then are connected in parallel with the conductor; and a cavity for an impact device to break the melt is provided on the shell body of the melt.

12. The excitation protection device acting step by step with a single excitation source according to claim 1, wherein in a case that a cavity where the excitation source is located is respectively communicated with cavities where individual impact devices are located, when the excitation source acts, the impact devices are driven to act simultaneously or successively; or, in a case that the cavity where the excitation source is located is communicated with a cavity where one of the impact devices is located, the cavities where the individual impact devices are located are respectively communicated in series through flow passages, when the excitation source acts, the impact devices are driven to act successively.

13. The excitation protection device acting step by step with a single excitation source according to claim 12, wherein when the cavities where the individual impact devices are located are respectively communicated in series through the flow passages, an impact device act first is displaced to open a flow passage opening communicating a cavity where an impact device act subsequently is located with a cavity where the impact device act first is located.

14. The excitation protection device acting step by step with a single excitation source according to claim 12, wherein one of the impact devices is centrally provided, and other impact devices are arranged around an outer side of the centrally provided impact device at intervals.

15. The excitation protection device acting step by step with a single excitation source according to claim 14, wherein the impact devices located on the outer side of the centrally provided impact device are all in annular structures, and are sequentially sleeved on an outer periphery of the centrally provided impact device at intervals.

16. The excitation protection device acting step by step with a single excitation source according to claim 15, wherein the impact devices in the annular structures are respectively provided with notches at a position of the conductor, and the conductor is located in the notches when the impact devices in the annular structures is displaced to break the melt.

17. The excitation protection device acting step by step with a single excitation source according to claim 12, wherein the impact devices are arranged around an outer side of the cavity where the excitation source is located.

18. The excitation protection device acting step by step with a single excitation source according to claim 12, wherein an indicator device in sealed contact with the shell body is provided on the shell body, a position-limiting mechanism is provided between the indicator device and the shell body; the indicator device communicates with a cavity where one of the impact devices acting simultaneously is located through a flow passage, or communicates with a cavity where one act last of the impact devices acting successively is located through the flow passage; an opening position of the flow passage of the indicator device in a cavity where a corresponding impact device is located satisfies: when actions of all the impact devices are completed, the indicator device overcomes the position-limiting mechanism to displace under an action of a driving force generated by the excitation source, and one end of the indicator device protrudes out of the shell body.

19. The excitation protection device acting step by step with a single excitation source according to claim 1, wherein a sealing device configured to seal contact surfaces is provided between contact surfaces of the impact devices and cavities where the impact devices are located and between contact surfaces of the excitation source and a cavity where the excitation source is located.

20. The excitation protection device acting step by step with a single excitation source according to claim 1, wherein the excitation source is an electronic ignition device or a hydraulic device that can receive an excitation signal and act; the electronic ignition device releases high-pressure gas, and the hydraulic device releases insulating high-pressure liquid.

* * * * *